United States Patent [19]

Theall, Jr.

[11] 4,257,125

[45] Mar. 17, 1981

[54] RECEIVER FOR UNIPOLAR MANCHESTER FIBER OPTICS SIGNALS

[75] Inventor: Charles E. Theall, Jr., Weston, Conn.

[73] Assignee: The Singer Company, Little Falls, N.J.

[21] Appl. No.: 35,119

[22] Filed: May 1, 1979

[51] Int. Cl.³ .............................................. H04B 9/00
[52] U.S. Cl. .................................... 455/608; 455/619; 375/55; 375/87; 340/347 DD
[58] Field of Search ...................... 358/262; 325/38 A; 250/199; 455/619, 608; 375/87, 77, 61, 37, 55, 28; 360/42; 307/232; 340/347 DD

[56] References Cited

U.S. PATENT DOCUMENTS

| | | | |
|---|---|---|---|
| 3,836,956 | 9/1974 | Cross | 375/87 |
| 3,979,746 | 9/1976 | Jarrett | 307/232 |
| 4,019,048 | 4/1977 | Maiome et al. | 455/608 |

Primary Examiner—Robert L. Griffin
Assistant Examiner—Edward L. Coles
Attorney, Agent, or Firm—Keith D. Beecher; Thomas W. Kennedy

[57] ABSTRACT

A receiver is provided for use in a fiber optic data communication system of the type employing unipolar trapezoidal Manchester data encoding. The receiver of the invention is capable of processing unipolar optical Manchester signals transmitted over optical fibers. The receiver converts the optical signals into electrical baseband signals, and then amplifies, filters and detects the electrical signals to provide standard digital levels at the receiver output. The receiver incorporates direct-current coupled amplifiers, fast automatic gain control circuitry for the amplifiers, direct current offset correction circuitry to prevent drift of the signal base line, and threshold circuitry controlled to assure half peak amplitude, or mid-amplitude, processing of the electrical signals.

9 Claims, 10 Drawing Figures

RECEIVER FOR UNIPOLAR MANCHESTER FIBER OPTICS SIGNALS

BACKGROUND

Prior art receivers for fiber optic signals have usually used fixed gain and alternating current coupling techniques. Any attempts automatically to control the gain of such receivers have been slow in response, and therefore inadequate. Also, the systems used in such prior art receivers for tracking signal level in the presence of large direct current drifts and offsets have used alternating current coupled amplifier stages, which have not proven to be satisfactory.

Drifts in the electrical signals in the receiver derived from converting the received optical signals which results, for example, from photodiode dark current, or amplifier offset voltages, can exceed the lowest signal levels in the receiver dynamic range. Signal base line stability must be maintained despite these drifts, because the final signal detection is essentially an amplitude identification process. The prior art receivers, however, are not capable of maintaining signal base line stability. When direct-coupled amplifiers are used in the prior art receivers, drift currents exceed the lower signal levels. On the other hand, alternating current coupled amplifiers gradually shift the signal base line to the half amplitude signal direct current component. Direct current coupled amplifiers with final alternating current coupled and direct current restoration output stages appear to be feasible. However, all these systems are susceptible to the effects of the receiver adjustable gain stage, which is required for the wide signal range to be processed by the receiver. The apparent voltage offset changes produced by the adjustable gain stage have a tendency to cause unwanted base line modulations.

In general, the large amplitude range that must be handled by receivers for unipolar trapezoidal Manchester fiber optic signals complicates the signal detection process. The two levels of the unipolar trapezoidal signal waveform and, especially the timing of the transitions between these levels, contain the essential data information. The large amplitude signals overdrive the amplifiers and limiters in the receivers, and this produces false width and transition distortions which can cause decoding errors.

As noted, the unipolar trapezoidal Manchester fiber optics signal is symmetrical about its half amplitude level. The comparator in the receiver detector provides an ideal detection stage if it switches the receiver output when the Manchester signal crosses the half peak amplitude level which is the best decision threshold. Signal amplitude at the comparator varies, however, in a transient manner during message start-up, and over steady stage line levels for wide amplitude ranges. A direct current threshold, or a threshold based merely on signal history, would not then occur at the half amplitude for every decision. This disparity between the signal half amplitude and the threshold causes additional errors in the prior art receivers.

Although electrical multi-terminal systems transmit a fairly constant, high amplitude, bipolar electrical signal to the various receivers, the fiber optics transmission system is unipolar in that information is represented by the presence or absence of optical data. Signal amplitude can vary over wide ranges because of system loss variations. The front end signal-to-noise ratio of the receiver defines the lower limit of the dynamic range of the signal. The unipolar Manchester optical signal has a trapezoidal shape with respect to the zero base line and therefore, a threshold set at half the signal peak amplitude is required in order to reproduce accurately the pulse width, this being essential in order to decode the signals.

Therefore, in the construction of a receiver suitable for the detection of trapezoidal unipolar Manchester fiber optic signals, certain critical aspects of the signals must be considered. These include the fact that the manchester optical signal is a unipolar signal with zero base line; that it has a trapezoidal wave shape which is symmetrical around the half peak amplitude level; that it is a low amplitude signal with high dynamic range (approximately 100:1); and that it has low transmission noise and wide transmission bandwidth.

Detection algorithms in the receiver are susceptible to noise at signal transitions as well as at peak amplitudes, and they rely on pulse-width accuracies for acceptable bit error rate performance. Accordingly, the receiver must exhibit low front end noise, good base line stability, linear or predictable amplitude response over a wide range, and an accurate decision threshold at the half peak amplitude signal levels.

Because of fiber optics inherent immunity to electromagnetic interference, the dominant noise sources in the fiber optic communication system occur at the input to the receiver. The receiver input includes a photo-detector stage, and noise currents are related to the reverse currents of the photodiode in that stage, and to the reverse currents of the gate of the field effect transistor also included in the photo-detector stage, by the expression:

$$\overline{i_N}^2 = 2qi_r \Delta f \quad (1)$$

where:
$q$ = the electronic charge, $1.6019 \times 10^{-19}$ coulomb
$i_r$ = reverse current
$\Delta f$ = noise bandwidth, Hz Amplifier input noise and resistor noise voltages are similar in form:

$$\overline{E_n}^2 = 4KTR \, \Delta f \quad (2)$$

where:
K = Boltzman's constant, $1.38 \times 10^{23}$ joules/degree Kelvin
T = temperature, degrees Kelvin
R = resistance or, for FET's $1/gm = R$
$\Delta f$ = bandwidth, Hz Because the optical input signal is an on-off, or unipolar signal, a linear mix of the signal and noise implies that the signal should be threshold detected at half peak amplitude for balanced exclusion of noise peaks.

The receiver of the invention makes a significant contribution to Manchester optical signal decoding in the presence of noise. A reduction in receiver bandwidth to about 1.25 times the bit ratio is effective to improve the signal-to-noise ratio and consequently reduces the bit error rate. Linear phase filters are used in the receiver, and these filters exhibit excellent phase and amplitude response, and have a linear phase characteristic which does not add any distortion to random phases or Gaussian noise. The filters also decrease the peaks of impulse noise to those of the signal frequencies within the filter pass band.

In the Manchester code, a 1,0,1 bit pattern has twice the period of either the 1,1,1, or 0,0,0 bit patterns. An optimum noise bandwidth filter is included in the receiver of the invention to convert the higher frequency square waves of the Manchester signal into sine waves; while the alternating patterns retain their trapezoidal shapes. Therefore, after propagation through low pass filters, the dissimilar bit sequences have different instantaneous signal-to-noise ratios. The receiver of the invention also includes means for preserving or predicting the half peak amplitude level of the Manchester signals so as to obviate amplitude width or transition distortion.

To reiterate, the zero crossings of the bipolar signals are equivalent to the half peak amplitude crossings of the Manchester signals. For the Manchester signals, errors in base line reference, thresholds, or signal half peak amplitude levels produce output widths or transition errors. The receiver of the invention is constructed to eliminate such errors. Stability of the signal base line provides the threshold and comparison circuits of the receiver with a reference to measure the input signal at the half peak amplitude level. Some of the significant sources of errors affecting the base line stability are photodiode dark current, amplifier offsets, drifts and leakages, and signal offsets. The receiver of the invention is constructed to compensate for errors produced by the foregoing error sources.

DETAILED DESCRIPTION OF THE ILLUSTRATED EMBODIMENTS

Figure 1:
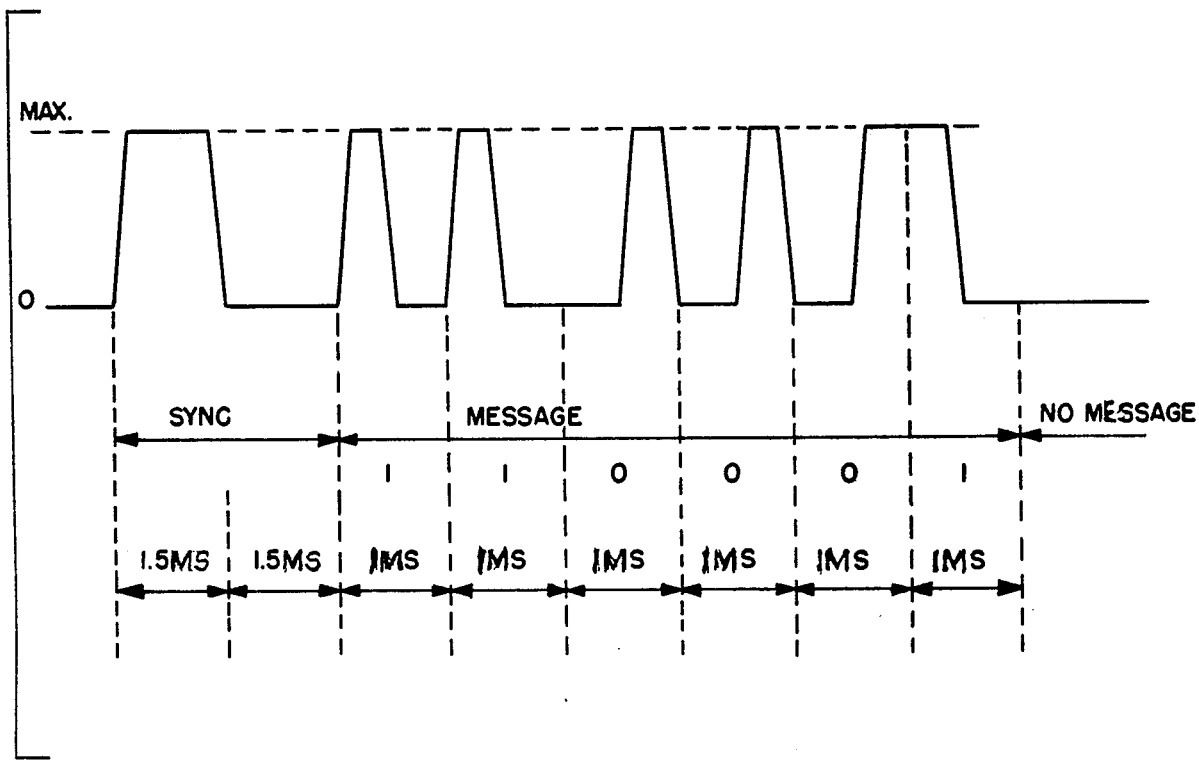
FIG. 1 is a representation of the unipolar trapezoidal Manchester optical signals transmitted in the fiber optics communication system with which the receiver of the present invention is concerned.

As shown in FIG. 1, the trapezoidal unipolar Manchester optical signals transmitted in the system with which the receiver of the present invention is concerned has a unipolar form, and rises from zero to maximum levels to designate the various binary bits encoded in the signal. The beginning of each message contains a synchronizing bit, as shown, which, for example, is 3.0 microseconds long. The signal then contains a series of message bits, each of which is 1 microsecond long, and each of which changes amplitude in the illustrated manner in order to designate a binary "1" or a binary "0".

Figure 2:
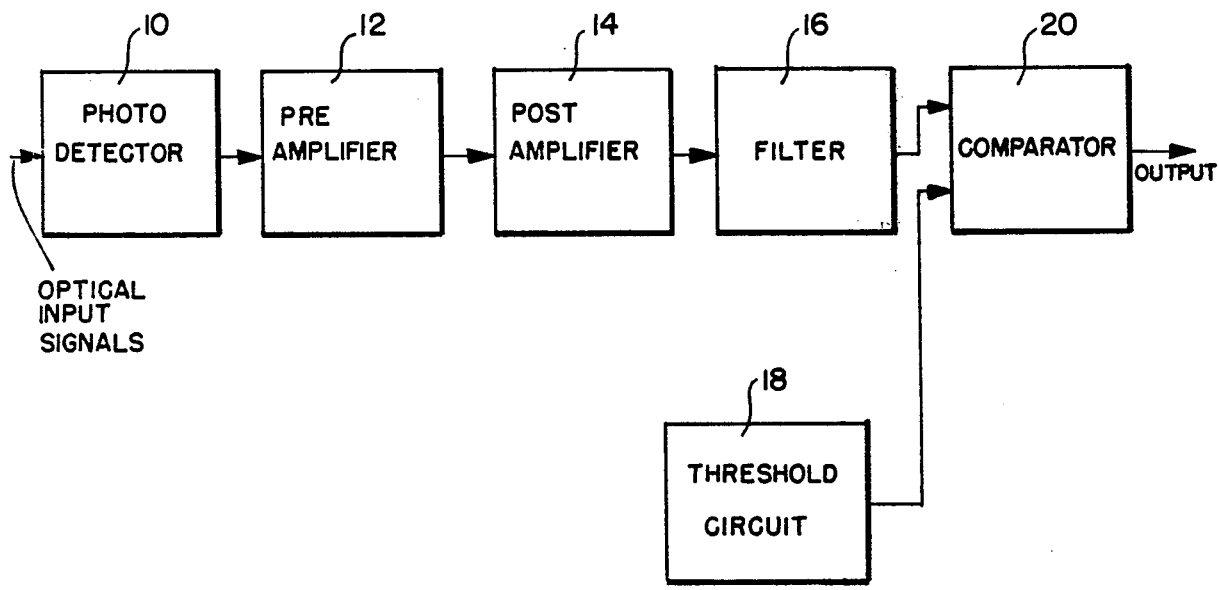
FIG. 2 is a block diagram of a receiver for detecting the optical signals of FIG. 1, constructed in accordance with the concepts of the invention.

The block diagram of FIG. 2 illustrates the essential elements of a base-band receiver constructed in accordance with the invention for receiving and decoding the Manchester unipolar signal of FIG. 1. The receiver includes a photo-detector 10 which detects the received optical signals of FIG. 1. The output current of the photo-detector is converted to a voltage and amplified by a pre-amplifier 12 and by a post-amplifier 14. A filter 16 reduces the noise bandwidth. The filter output signal is compared with a threshold derived from a threshold circuit 18 in a comparator circuit 20, and the output from the comparator is decoded by a detection algorithm in an appropriate unit (not shown).

The photo-detector 10 includes a photodiode which typically has a linear response of 0.5 amps per watt over its input power range at infrared wavelengths. The response speeds of commercially available photodiodes are adequate for operation to 10 mb/s. Depleted operating junctions are important to avoid follow-on "long tails". When the photodiode in photo-detector 10 is operating in the current mode with a large bias voltage, direct current dark currents and wideband noise currents become significant at high temperature. Shunt capacitance of the photodiode is critical because of its effect on pre-amplifier noise and signal frequency response.

The pre-amplifier 12 performs a wide-band conversion of the photo-detector output current to an input voltage for the post-amplifier 14 with minimum introduction of noise. Since the photo-detector 10 is a current source, detector and amplifier input impedances can have band-limiting effects on the receiver unless low input impedance amplifiers are used. The pre-amplifier 12 can approximate unity gains for amplifier and resistor noise. Even with these favorable noise gains, amplifier noise dominates the photo-detector noise except at high temperature.

The post-amplifier 14 amplifies all signals in the input amplitude range to the level required for comparison by comparator 20 and subsequent detection.

The filter 16 decreases the noise root means square (RMS) voltage by a factor:

$$\sqrt{\text{Filter Bandwidth/Input Noise Bandwidth}}$$

effecting a significant improvement in the signal-to-noise ratio at the receiver comparator 20.

The comparator 20, in effect, converts unipolar signals to bipolar signals. The threshold circuit serves to predict the mid-amplitude level of the optical input signals. This accurate, timely prediction of the mid-amplitude signal crossings is the most critical receiver function. The preceding stages contribute with excellent noise, linearity and gain performances. The threshold circuit 18 generates a bias for the comparator 20, which enables the bipolar output signal to be generated without width or transition distortions.

Together with the threshold bias provided by threshold circuit 18, comparator 20 converts the unipolar signal into a bipolar output signal. That is, the comparator switches at the mid-amplitude points of the optical input signal. The comparator also represents a critical receiver function in relation to the detection algorithm in that pulse width and transition time deviations contribute materially to detection errors.

Figure 3:
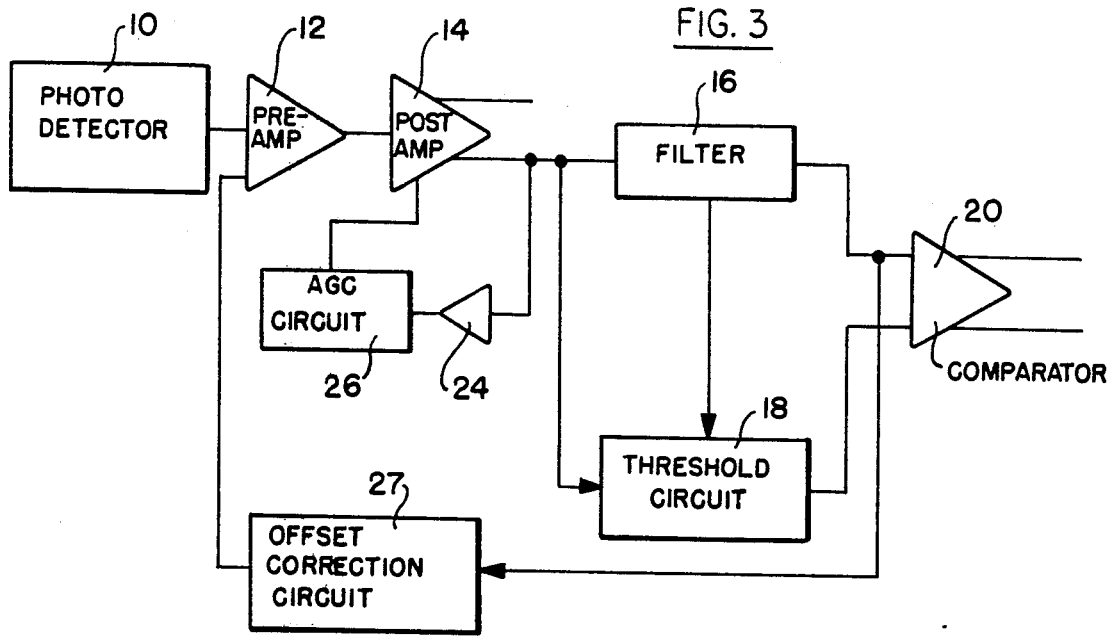
FIGS. 3 and 4 are block diagrams showing various features which may be included in the receiver of FIG. 2.

The receiver of FIG. 3 includes an automatic gain control (AGC) circuit 26 and an AGC input amplifier 24; the amplifier being connected to the output of the post-amplifier 14, and the AGC circuit controlling the gain of the post-amplifier. The receiver of FIG. 3 also includes an offset correction circuit 26 which is connected from the output of filter 16 back to a second input of pre-amplifier 12.

The input unipolar Manchester optical signal is linearly converted to a range of photo-detector currents by the photo-detector 10 which, together with the pre-amplifier 12, are linear throughout the signal range. As shown in FIG. 3, the signal then requires gain adjustments on the order of 40 dB in the post-amplifier 14. An operable receiver requires that the automatic gain control must virtually acquire control within the time of the synchronizing pulse of FIG. 1, and must be in full control after a few data pulses. Threshold sampling of signal amplitude for the threshold circuit 18 occurs early in the signal filter 16, and subsequent filter delay insures that the threshold voltage will precede the signal at comparator 20.

Figure 4:
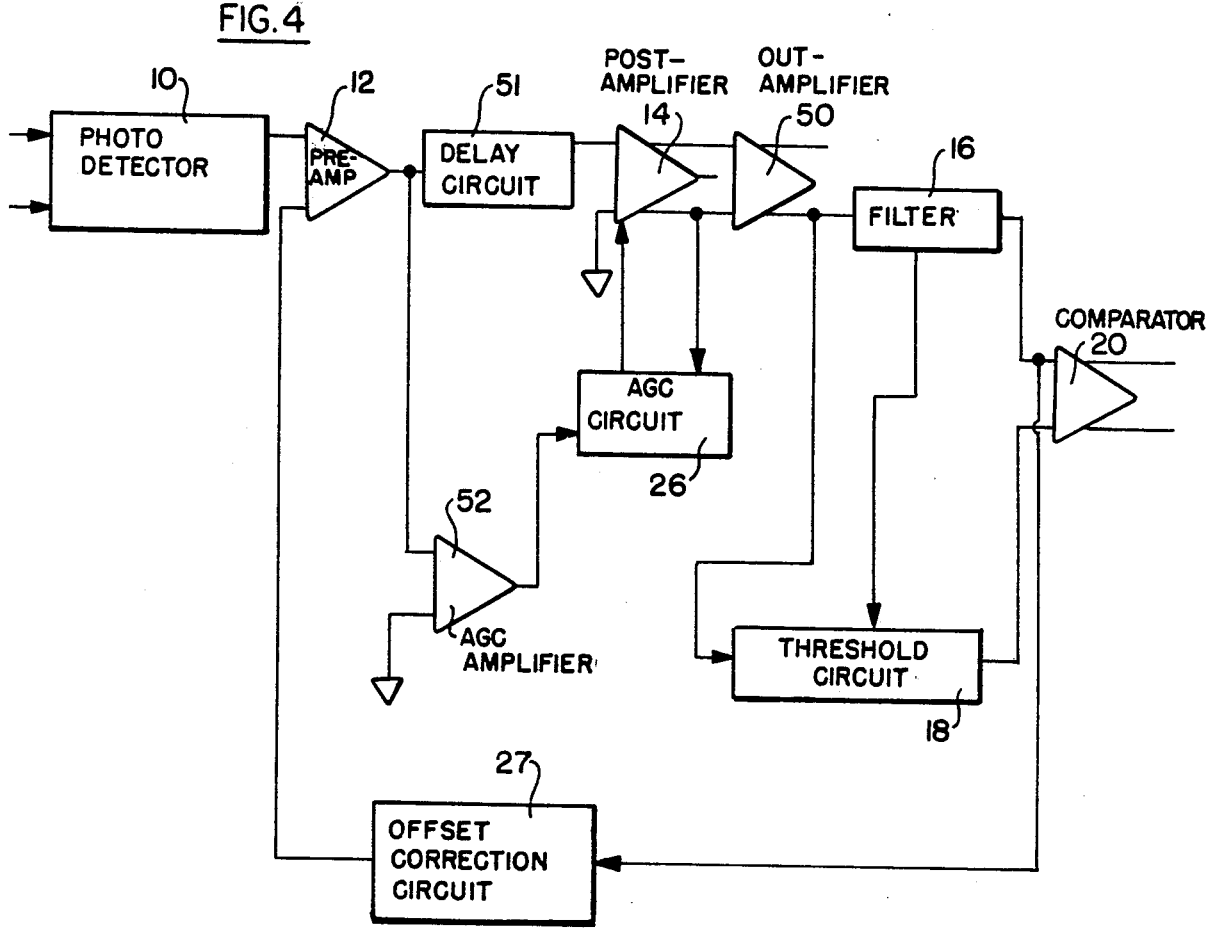

The receiver of FIG. 4 incorporates the automatic gain control circuit 26, and it also includes a delayed signal control to assure AGC acquisition during the signal delay period. The receiver includes an out-amplifier 50 between the post-amplifier 14 and filter 16, a delay circuit 51 between the pre-amplifier 12 and post-amplifier 14 to provide the signal delay period. The receiver also includes a further AGC amplifier 52 connected to the output of the pre-amplifier 12 and to the AGC circuit 26 for fast AGC action. For 10 mbs data rate, gain control circuits are required to acquire the control voltage during the first 150 nanosecond synchronizing pulse of FIG. 1, as mentioned above. Since the automatic gain control reaction time is critical compared with the synchronizing pulse duration, the circuit of FIG. 4, using one delayed channel amplifier, and a second feed-forward amplifier to assist control voltage generation, provides control acquisition during the signal delay period.

Figure 5:
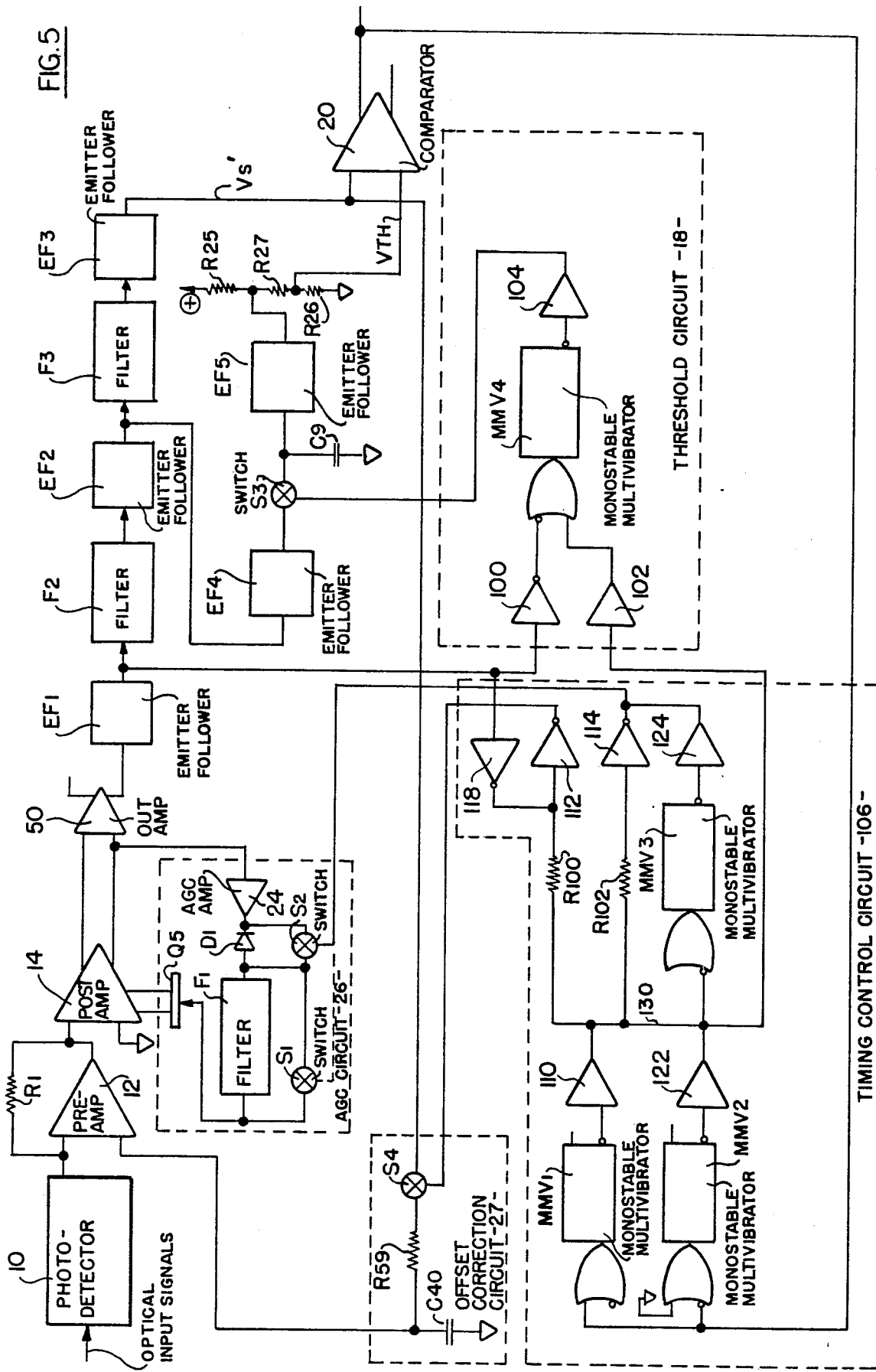
FIG. 5 is a more detailed block diagram of one embodiment of the receiver of the invention.

A detailed block diagram of a presently preferred embodiment of the invention is shown in FIG. 5. As shown in FIG. 5, the photo-detector 10 is connected to one of the inputs of pre-amplifier 12. The output of pre-amplifier 12 is connected to one of the inputs of post-amplifier 14. A resistor R1 is bridged between the output and the aforesaid input of the pre-amplifier. The other input of post-amplifier 14 is grounded. The outputs of the post-amplifier are introduced to the out-amplifier 50. The output of out-amplifier 50 is passed through am emitter follower EF1 to the input of a filter F2. The output of filter F2 is passed through an emitter follower EF2 to a filter F3. Finally, the output of filter F3 is passed through an emitter follower EF3 to provide the signal input ($V_s'$) to one input terminal of comparator 20.

Threshold circuit 18 includes an inverter 100 and an amplifier 102 which are connected to a 0.3 microsecond monostable multivibrator MMU4. The output of multivibrator MMU4 is connected through an amplifier 104 to a switch S3. The output of emitter follower EF2 is passed through a second emitter follower EF4 and through switch S3 to an emitter follower EF5. The input terminal of emitter follower EF5 is connected to a grounded capacitor C9, and the output of the emitter follower is connected to the junction of a pair of resistors R25 and R27. These resistors, together with a further resistor R26 are connected between the positive terminal of the exciting voltage source and ground. The junction of resistors R27 and R26 is connected to the other input of comparator 20, and supplies the threshold level ($V_{th}$) to the comparator.

The receiver of FIG. 5 also includes the automatic gain control circuit 26. The automatic gain control circuit includes the input amplifier 24, whose output is passed through a diode D1 and filter F1 to the gate of a field effect transistor (FET) Q5, the source and drain electrodes of the FET being connected to post-amplifier 14 to control its gain. Filter F1 is bridged by a switch S1, and diode D1 is bridged by a switch S2.

The offset correction circuit 27 includes a switch S4 which is connected to a resistor R59 which, in turn, is connected to the other input of pre-amplifier 12. Resistor S4 is connected to the output terminal of emitter follower EF3.

The switch S4, and the switches S1 and S2, are operated by a timing control circuit 106. The timing control circuit includes a pair of 2.5 microsecond monostable multivibrators MMV1 and MMV2 which are controlled by the output of comparator 20. Multivibrator MMV1 is connected through an amplifier 110 and through a resistor R100 and an inverter 112. The inverter controls switch S4. The amplifier 110 is also connected through a resistor R102 to an inverter 114 which controls the switches S1 and S2. The output of emitter follower EF1 is passed through an inverter 118 to the input of inverter 112. The monostable multivibrator MMV2 has its output passed through an amplifier 122 to a 1 microsecond monostable multivibrator MMV3, the output of the latter multivibrator being passed through an amplifier 124 to control switches S1 and S2. The outputs of amplifiers 110 and 122 are connected together by a bus 130.

During the receipt of the optical input signal of FIG. 1, a photodiode in the photo-detector 10 responds to the optical energy, and introduces current pulses to one of the inputs of pre-amplifier 12. Pre-amplifier 12 amplifies these current pulses and produces an output signal. The output signal is further amplified by post-amplifier 14 and out-amplifier 50. The gain of post-amplifier 14 is adjusted by the automatic gain control loop which is made up of amplifier 24, diode D1, filter F1 and field effect transistor Q5. The output of the out-amplifier 50 is passed through filters F2 and F3 which reduce the noise voltages and which apply the amplified, filtered and delayed signal voltage ($V_s'$) to one input of comparator 20.

The threshold circuit 18 which includes the monostable multivibrator MMV4, and which controls switch S3 and capacitor C9, causes the capacitor C9 to store the signal peak amplitude, so as to develop a threshold voltage ($V_{th}$). The potential divider resistors R26 and R27 apply the threshold voltage ($V_{th}$) to the second input of the comparator 20. The comparator switches the receiver output levels whenever the signal amplitude ($V_s'$) and the threshold voltage amplitude ($V_{th}$) are equal, that is, during each signal transition at the half-peak amplitude level of the input signal.

Figure 6:
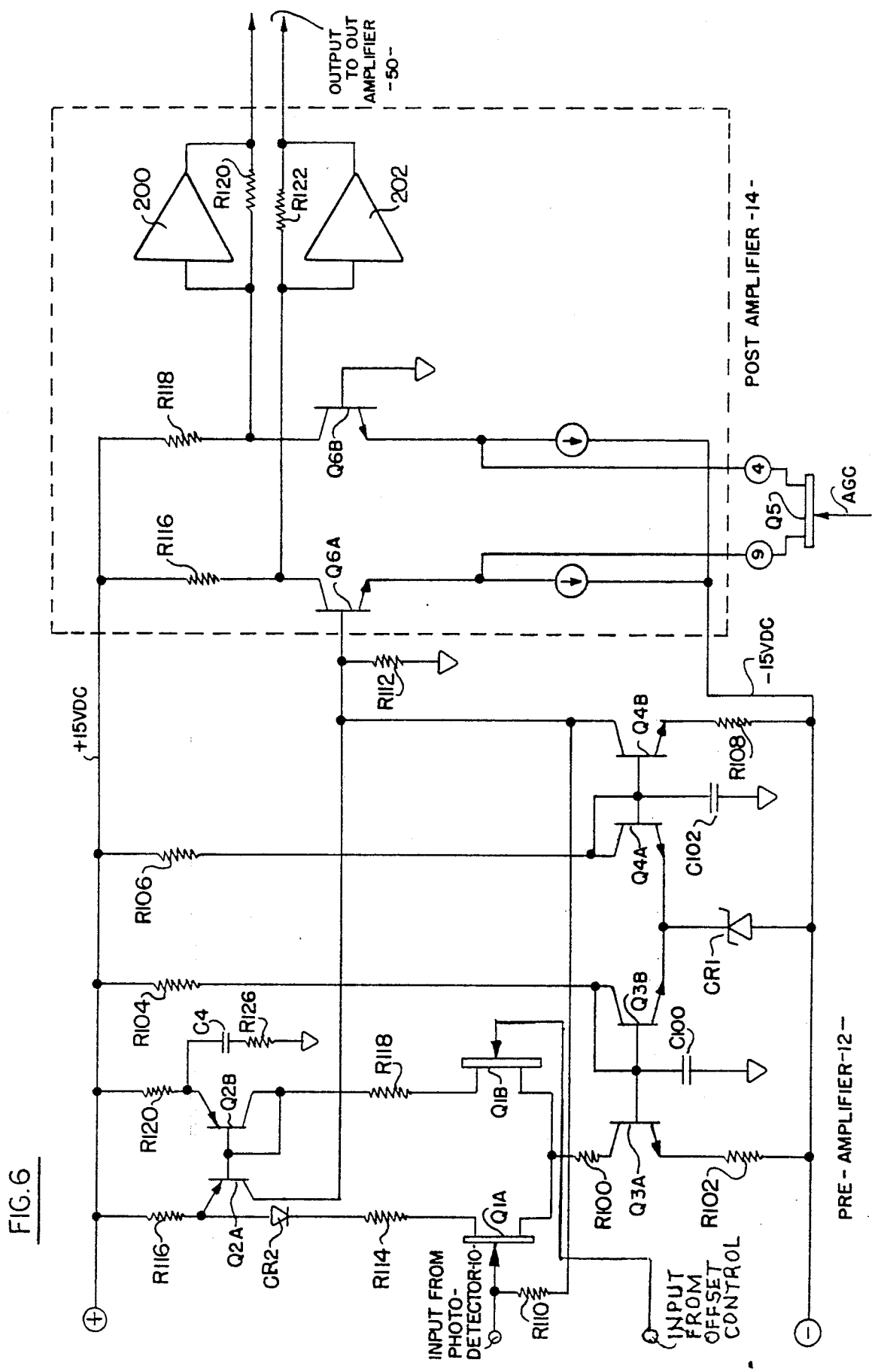
FIG. 6 is a logic circuit diagram of certain components in the receiver of FIG. 5.

The circuit of the pre-amplifier 12 is shown in FIG. 6. The pre-amplifier includes a pair of field effect transistors (FETS) Q1A and Q1B. The drain electrodes of the FETS are connected together, and through a 180 ohm resistor R100 to the collector of an NPN transistor Q3A. The base of the NPN transistor Q3A is connected to a negative 15-volt source through a 1 kilo-ohm resistor R102. The base of transistor Q3A is connected to the base of an NPN transistor Q3B and to a grounded 0.1 microfarad capacitor C100. The collector of transistor Q3B is connected back to its base, and to the positive terminal of the 15-volt source through a 7680 ohm resistor R104.

The emitter of transistor Q3B is connected to the emitter of an NPN transistor Q4A and through a Zener diode CR1 to the negative 15-volt source. The collector of transistor Q4A is connected through a 14 kilo-ohm resistor R106 to a positive 15-volt source, and back to the base of the transistor and to a 0.1 grounded capacitor C102. The base of transistor Q4A is also connected to the base of an NPN transistor Q4B, the emitter of which is connected through a 2 kilo-ohm resistor R018 to the negative 15-volt source. The collector of transistor Q4B is connected through a 20 kilo-ohm resistor R110 to the gate of FET Q1A. The input derived from the photo-detector 10 is also introduced to the gate of the FET Q1A. Q1B's gate is offset control input.

The collector of transistor Q4B is also connected to the input of the post-amplifier 14 and to a grounded 10 kilo-ohm resistor R112. The drain electrode of FET Q1A is connected through a 180 ohm resistor R114, through a diode CR2 and through a 1 kilo-ohm resistor R116 to the positive 15-volt source. Likewise, the drain electrode of transistor q 1B is connected through a 180 ohm resistor R118 to the collector of a PNP transistor Q2B and to the base electrodes of the transistor Q2B and of a further PNP transistor Q2A. The emitter of transistor Q2A is connected to the junction of resistor R116 and diode CR2, and the emitter of transistor Q2B is connected through a 2 kilo-ohm resistor R120 to the positive 15-volt source, and through a 220 picofarad capacitor C4 to a grounded 200 ohm resistor R126.

The pre-amplifier 12 of FIG. 6 converts the signal current output from the photo-detector 10 into pre-amplifier output voltage pulses. The FETS Q1A and Q1B are each part of a low-noise dual FET which is connected as a differential amplifier for low direct current drift. The FETS Q1A and Q1B both provide gain. The FET Q1A is connected to transistor Q2A in a cascode arrangement to minimize input capacitance effects at resistor R110. The transistors Q1B and Q2A are cascaded amplifiers. Current pulses passing through transistor Q2A develop a pulsed output voltage across resistor R112. The direct current of transistor Q2A returns through transistor Q4B. The output voltage appearing across resistor R112 is fed back to the gate of the FET Q1A by way of resistor R110. The Zener diode CR1, and the transistors Q3B and Q4A form a diode compensated, Zener biased circuit for the current sources formed by transistors Q3A and Q4B.

The characteristics of the pre-amplifier 12 of FIG. 6 include low input impedance, low equivalent input noise, low direct current drift and good rejection of power supply variations.

The post-amplifier 14, as also shown in FIG. 6, is an integrated circuit, type SE592, with differential inputs and outputs. As shown in FIG. 6, the integrated circuit forms a pair of NPN transistors Q6A and Q6B. The emitters of the transistors are connected to the source and drain electrodes of the field effect transistor Q5 in the automatic gain control circuit 26. The collectors of transistors Q6A and Q6B are connected through respective 2.4 kilo-ohm resistors R116 and R118 to the positive 15-volt source. The collectors are also connected to respective amplifiers 200 and 202, each of which is shunted by a 7 kilo-ohm resistor R120 amd R122. The outputs of the amplifiers 200 and 202 are connected to the out-amplifier 50 of FIG. 5.

In the post-amplifier circuit, the input from the pre-amplifier is applied to the base of transistor Q6A, and the base of transistor Q6B is grounded. The field effect transistor Q5 adjusts the gain of the post-amplifier 14. Variation of the drain-to-source resistance of FET Q5 from high to low smoothly adjusts the gain of post-amplifier 14 from approximately 1 to 400.

The linear phase filters F2 and F3 of FIG. 5 provide spike filtering, delay and noise bandwidth reduction with good signal time response. The wideband filter F2 removes spikes from the signal, so that a transient free input appears at the threshold sample and hold circuit switch S3. The total time delay of the filters F2 and F3 exceeds the delay of the formation of the threshold voltage, and each data pulse is detected with its own correct threshold level. The filters F2 and F3 together yield a bandwidth of 1.4 times the bit rate for noise reduction. The linear phase characteristic of the filters yields a signal wave of constant delay with negligible overshoot, that is they yield good step response.

Figure 7:
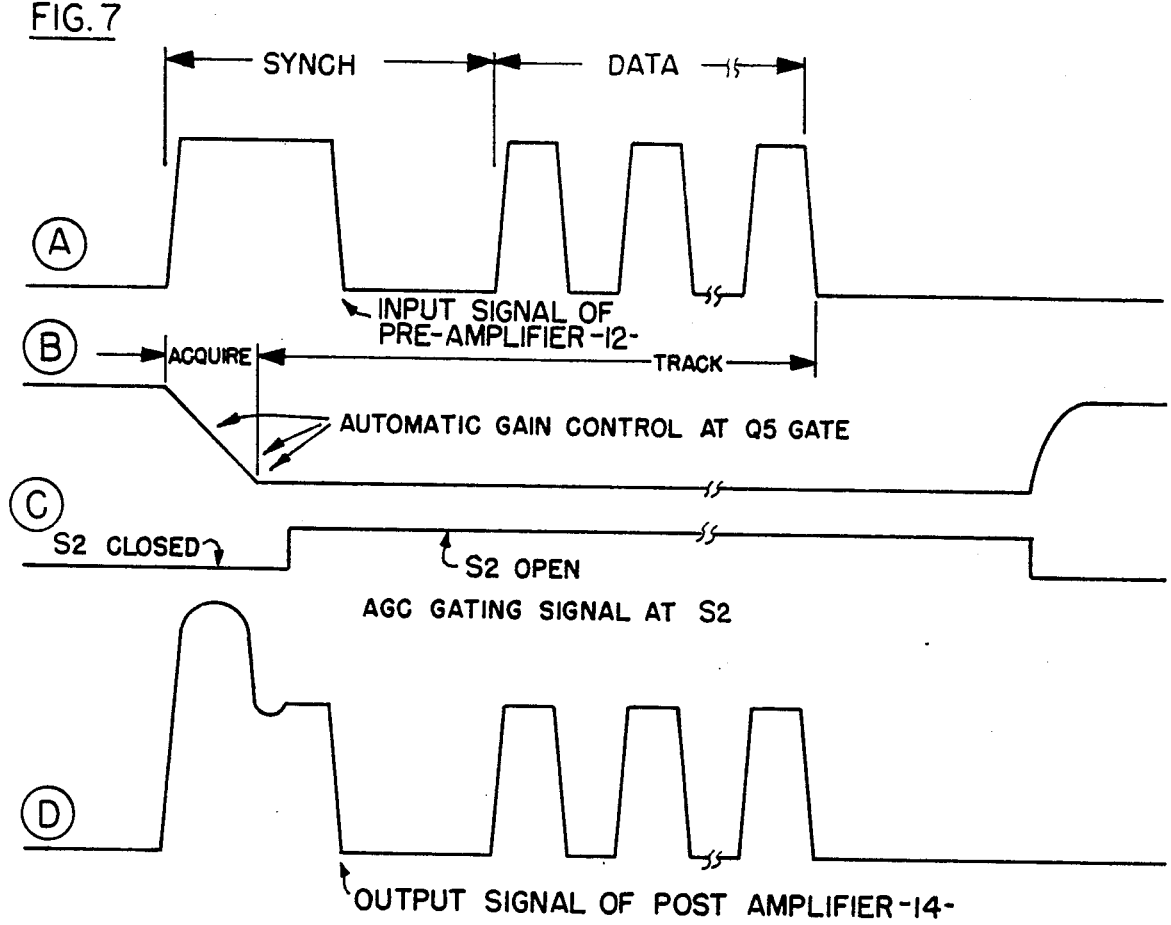
FIG. 7 is a series of curves useful in explaining the operation of the receiver of FIG. 5.

In FIG. 7, curve A shows the input signal of the pre-amplifier 12, and it is similar to the signal shown in FIG. 1. Curve B shows the automatic gain control produced by the automatic gain control circuit at the gate of the FET Q5. Curve C shows the automatic gain control gating signal at switch S2. Curve D shows the gain control output signal of post-amplifier 14.

During the receipt of the message portion of the input signal of FIG. 1, the automatic gain control circuit 26 adjusts the gain of the post-amplifier 14 in a linear manner. At the first pulse of a new message, post-amplifier 14 drives automatic gain control amplifier 24, diode D1, and filter F1 (FIG. 5) to increase the bias of FET Q5 with the ramp voltage shown in FIG. 7B. Switches S1 and S2, being initially closed, speed up the control acquisition. Switch S2 shunts diode D1 and allows bidirectional current; whereas switch S1 shunts filter F1 and decreases the delay produced by that filter. Acquisition of linear gain is fast, within 1 microsecond in the first message synchronizing pulse. After acquisition, yet still within the first message synchronizing pulse (FIG. 7A) the timing control circuit 106 opens the switches S1 and S2 (FIG. 7C). The automatic gain control circuit 26 thereafter maintains control through the message by means of the diode D1 and filter F1 (FIG. 7B). After an interval of 2.5 microseconds following the end of the message of FIG. 1, the timing control circuit 106 again closes the switches S1 and S2 (FIG. 7C), and this action resets the automatic gain control voltage to full gain condition (FIG. 7B).

Figure 8:
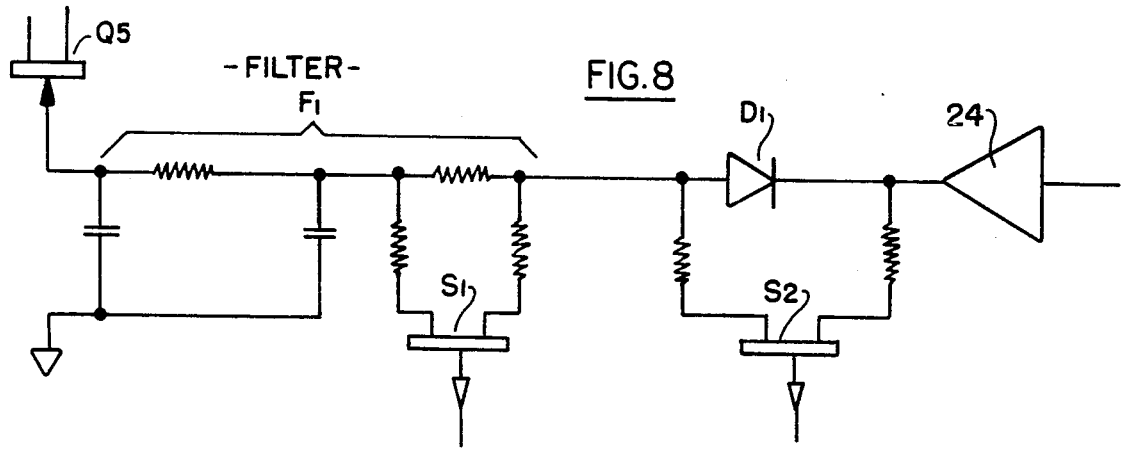
FIGS. 8 and 9 are different versions of a fast acting automatic gain control circuit included in the receiver of FIG. 5.
Figure 9:
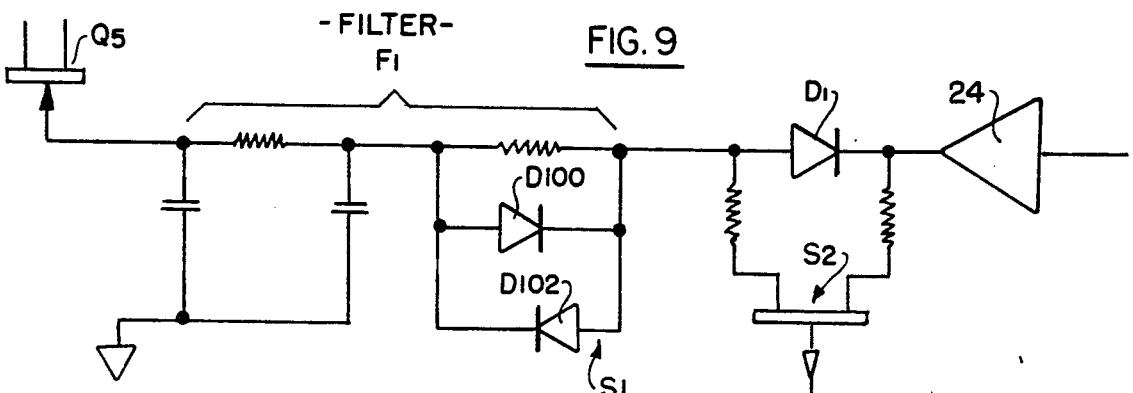

The circuits of FIGS. 8 and 9 are automatic gain control loops for controlling the gate of the field effect transistor Q5. In the circuit of FIG. 8, for example, the switches S1 and S2 are formed by field effect transistors. In the circuit of FIG. 9, the switch S1, however, is formed by reversely connected diodes D100 and D102. In the circuit of FIG. 8, the timing control circuit 106 drives the field effect transistors forming the switches S1 and S2 with a discrete step waveform. In the circuit of FIG. 9, large AGC differential voltages turn on the diodes D100 and D102 for acquisition and reset.

The positive rise of every signal pulse at the output of the out-amplifier 50 and emitter follower EF1 of FIG. 5 initiates a sample-hold threshold cycle of the threshold circuit 18. Each signal pulse triggers monostable multivibrator MMV4 which closes switch S3 for 0.3 microseconds and, thereby, stores the peak signal voltage at the output of emitter follower EF4 in capacitor C9.

Resistors R26 and R27 divide this voltage down to the threshold level ($V_{th}$).

The time delay of filter F3 insures that the signal pulse ($V_s'$) arrives at the comparator A5 at the same time the threshold ($V_{th}$) is completely formed, so that pulse detection occurs without threshold timing compromises.

Receiver input drifts, for example photodiode dark current and amplifier offset voltage, can be large compared with the lower signal levels in the dynamic range of the receiver, as pointed out above. Because precise identification of signal half amplitudes is the requirement of the detection process of the receiver, freedom from base line shift is of critical importance.

In the offset correction circuit shown in FIG. 5, switch S4 connects the receivers amplifiers in a unity gain, DC coupled feedback amplifier configuration during the message-off condition of the input signal. In this manner the correct offset compensating voltage is stored in capacitor C40. At the first pulse of the new message, switch S4 opens, and thereafter all receiver stages operate with negligible offset for the duration of the message. This is because the voltage across capacitor C40 acts as a compensating voltage for actual offsets. At the end of the message, the switch S4 again closes and restores the voltage across capacitor C40. The system described above permits direct current coupling of all stages and, at the same time, excellent signal base line stability for the threshold and detection functions.

The timing control circuit 106 provides switching signals for the receiver functions described above. Each rise in the receivers output triggers monostable multivibrator MMV1, and each fall of the receivers output triggers monostable multivibrator MMV2. The gating level at the wired-or connected outputs of the multivibrators starts with the first message synchronizing pulse, and ends 2.5 microseconds after the end of the message. The resulting message-long gating level switches three receiver functions, namely: (a) The gating level opens the switch S4 to place the offset correction loop in a "message-on" condition, this action being anticipated and aided by an earlier step at the input to the F2 filter; (b) With its start delayed by the multivibrator MMV3, the gating level opens the AGC switches S1 and S2 after AGC acquisition, and closes the switches for AGC reset after the message ends; and (c) After the message ends, the gating level triggers the multivibrator MMV4 and thus closes the switch S3 for threshold reset. The periods of the multivibrators relate to 1 Mb/s bit rate messages, and these periods would be scaled appropriately for other bit rates.

Figure 10:
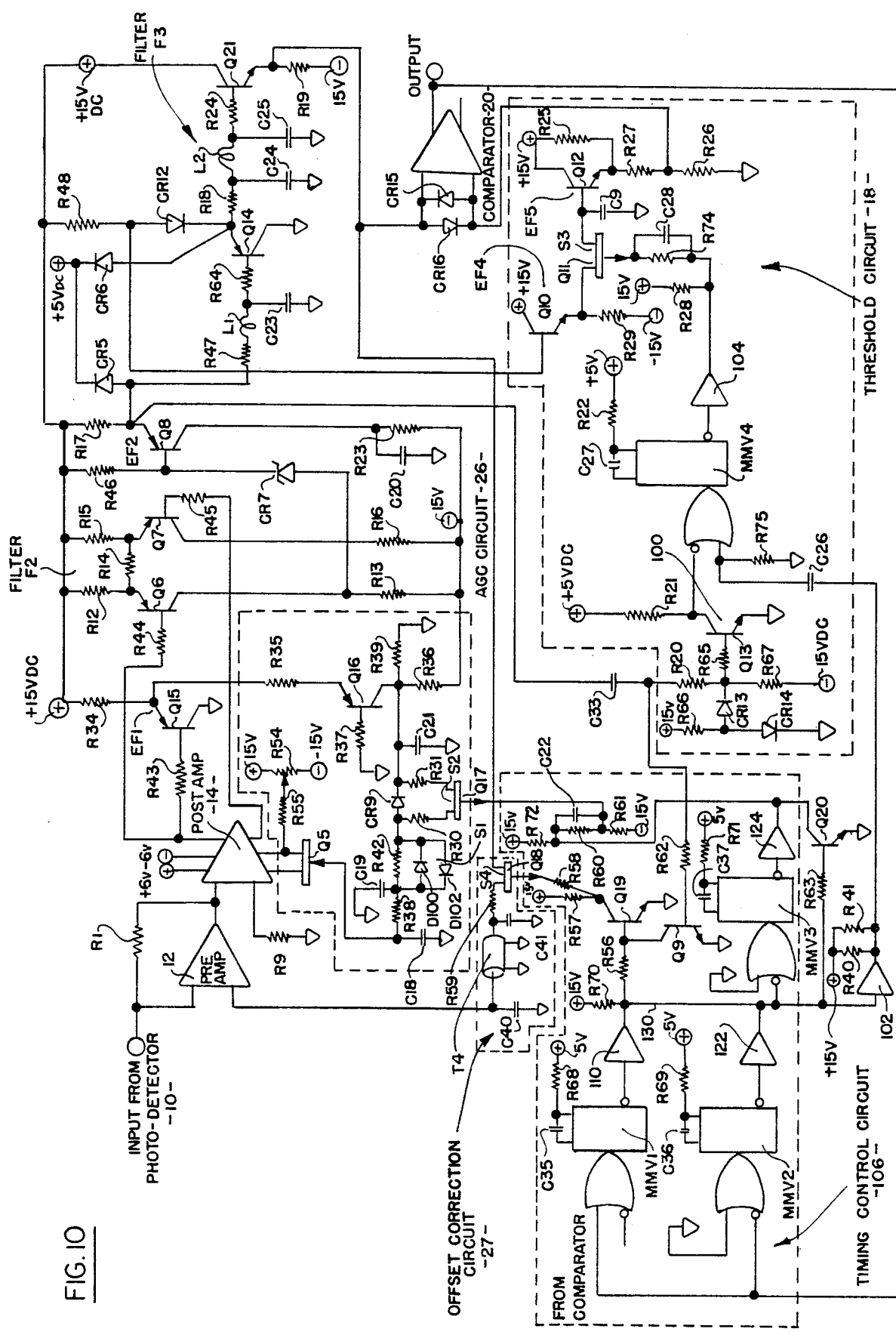
FIG. 10 is a full circuit diagram of the receiver of FIG. 5.

The receiver of FIG. 5 is shown in circuit detail in FIG. 10. As illustrated in FIG. 10, the pre-amplifier 12 is shunted by the 20 kilo-ohm resistor R1, and introduces its amplifier to post-amplifier 14. The post-amplifier 14 may be an integrated circuit of the type designated SE592, as noted above. Pin 7 of the integrated circuit is connected through a 130 ohm resistor R43 to the base of a PNP transistor Q15. The emitter of transistor Q15 is connected through a 750 ohm resistor R34 to the positive terminal of the 15-volt source to form emitter follower EF1. Pin 7 is also connected through a 130 ohm resistor R44 to the base of a PNP transistor Q6. Transistor Q6 and a further transistor Q7 may be of the type designated 2N3251, whereas transistor Q15 may be of the type designated 2N4957. The emitters of transistors Q6 and Q7 are connected to the positive 15-volt source through respective 3.01 kilo-ohm resistors R12 and R15, and are interconnected through a 549 ohm resistor 14. The collector of transistor Q12 is connected to the negative 15-volt source through a 1780 ohm resistor R13, and the collector of transistor Q7 is connected to the negative source through a 2280 ohm resistor R16. Output pin 6 of post-amplifier 14 is connected through a 130 ohm resistor R45 to the base of transistor Q7.

The collector of transistor Q6 is connected through Zener diode CR7, which may be of the type designated IN753A to the base of a PNP transistor Q8, which may be of the type designated 2N3251. Transistor Q8 forms the emitter follower stage EF2. Its base is connected to the positive 15-volt source through an 18 kilo-ohm resistor R46, and its emitter is connected to the positive terminal through a 1 kilo-ohm resistor R17. The collector of transistor Q8 is connected through a 750 ohm resistor R23 to the negative 15-volt source, and to a grounded 0.33 microfarad capacitor C20.

The emitter of transistor Q8 is connected through a 1.3 kilo-ohm resistor R47 and through a 47 microhenry inductance coil L1 to a 240 ohm resistor R69 and to a grounded 68 picofarad capacitor C23. The resistor is connected to the base of a transistor Q14 which may be of the type desiganted 2N3251. The collector of transistor Q14 is grounded, and the emitter is connected through a diode CR12 and through a 1.8 kilo-ohm resistor R48 to the positive 15-volt source. The emitter of transistor Q8 and the emitter of transistor Q14 are connected through respective diodes CR5 and CR6 to a positive 5-volt direct current source. These diodes may be of the type designated IN4154.

The emitter of transistor Q14 is connected through a 1.1 kilo-ohm resistor R18 and through a 120 microhenry inductance coil L2 to a 270 ohm resistor R24. The junction of resistor R18 and inductance coil L2 is connected to a grounded 47 picofarad capacitor C24, and the junction of inductance coil L2 and resistor R24 is connected to a grounded 162 picofarad capacitor C25. The elements described above constitute the filter F3 of FIG. 7.

Resistor R24 is connected to the base of an NPN transistor Q21 which may be of the type desiganted 2N3947. Transistor Q21 forms the emitter follower stage EF3 of the receiver of FIG. 7. Its collector is connected to the positive 15-volt source, and its emitter is connected through a 5.1 kilo-ohm resistor R19 to the negative 15-volt source.

The emitter of transistor Q21 is connected to the drain electrode of a field effect transistor Q18 in the offset correction circuit 27. FET Q18 may be of the type designated 2N3386, and it constitutes the switch S4 in the circuit of FIG. 7. The source electrode of the FET is connected through a 20 kilo-ohm resistor R59 and through a transmission line TL1 to the grounded capacitor C40, which may have a value of 1 microfarad. The capacitor is also connected to an input of pre-amplifier 12, as described above. Resistor R59 is also connected to a grounded 1 microfarad capacitor C41.

The gate of FET Q18 is connected through a 3.3 kilo-ohm resistor R58 to the collector of an NPN transistor Q19 in the timing control circuit 106. The collector of transistor Q19 is also connected through a 51 kilo-ohm resistor R17 to the positive terminal of the 15-volt source.

The transistor Q8 which forms the emitter follower stage EF2 also has its emitter coupled through a 6.8 micro-farad capacitor C33 to a 3.3 kilo-ohm resistor R62. The resistor is connected to the base of an NPN transistor Q9 which may be of the type designated 2N2369. The emitter of transistor Q9 is grounded, and the collector is connected to the base of transistor Q19 which may be of the type designated 2N3227.

The timing control circuit 106 includes multivibrators MMV1 and MMV2, as described above, which may be of the type designated 96L02. The multivibrators include respective 220 picofarad capacitors C35 and C36, which are connected through respective 39 kilo-ohm resistors R68 and R69 to the positive 5-volt source. Multivibrator MMV1 is coupled through amplifier 110 to bus 130, and through a 5.1 kilo-ohm resistor R70 to the positive 15-volt source. The multivibrator MMV2 is coupled through amplifier 122 to bus 130. The amplifiers 110 and 122 may be of the type designated 5417, and they constitute an "or" gate for the outputs of the multivibrators.

Bus 130 is connected through an 8.2 kilo-ohm resistor R56 to the base of transistor Q19. The bus is also connected to multivibrator MMV3 which, likewise, may be of the type designated 9602. A 39 picofarad capacitor C37 is included in the multivibrator, and it is connected through a 10 kilo-ohm resistor R71 to the positive 5-volt source. The output of multivibrator MMV3 is coupled through amplifier 124 and through a 1.8 kilo-ohm resistor R72 to the positive 15-volt source. The output of amplifier 124 is also connected through a 3.3 kilo-ohm resistor R73 to the gate of FET Q17 to operate switch S2. The output is also connected through a 6.8 kilo-ohm resistor R16 and through a 39 kilo-ohm resistor R61 to the negative 15-volt source. Resistor R60 is shunted by a 100 picofarad capacitor C22.

Bus 130 is also coupled through amplifier 102, and through a 100 picofarad coupling capacitor C26 to an input of the multivibrator MMV4 in the threshold circuit 18. Multivibrator MMV4 may be of the type designated 9602. The output of amplifier 102 is connected through an 18 kilo-ohm resistor R40 and through a 1.8 kilo-ohm resistor R41, connected in shunt, to the positive 15-volt source.

The bus 130 is also connected through a 6.8 kilo-ohm resistor R63 to the base of an NPN transistor Q20. The transistor Q20 may be of the type designated 2N3227. The emitter of the transistor is grounded, and the collector is connected to the output of amplifier 124.

The coupling capacitor C33 is also connected through a 1.8 kilo-ohm resistor R20 and through a 270 ohm resistor R65 to the base of an NPN transistor Q13. Transistor Q13 forms the amplifier 100 of the receiver of FIG. 7, and its collector is connected to an input of multivibrator MMV4. The collector is also connected through a 2.2 kilo-ohm resistor R21 to the positive terminal of the 5-volt direct current source. The resistor R20 is connected through a 300 kilo-ohm resistor R67 to the negative terminal of the 15-volt source. The junction of resistors R20 and R67 is connected through a diode CR13 to the junction of a diode CR14 and of a 5.1 kil-ohm resistor R66. The cathode of diode CR14 is grounded, and resistor R66 is connected to the positive 15-volt source.

Multivibrator MMV4 includes a 27 picofarad capacitor C27 which is connected through a 10 kilo-ohm resistor R22 to the positive 5-volt source. Capacitor C26 is also connected to a grounded 200 ohm resistor R75. The output of the multivibrator MMV4 is coupled through the amplifier 104, and through a 2.4 kilo-ohm resistor R74 to the gate electrode of an FET Q11 which forms the switch S3 in the receiver of FIG. 7. FET Q11 may be of the type designated 2N3114. Resistor R74 is shunted by a 75 picofarad capacitor C28. Amplifier 104 may be of the type designated 5417. The output of the amplifier is also connected through a 2.5 kilo-ohm resistor R28 to the positive 15-volt source.

The junction of diode CR12 and resistor R48 in the filter F3 is connected to the base of an NPN transistor Q10. Transistor Q10 may be of the type designated 2N3947. The collector of the transistor is connected to the positive 15-volt source, and the emitter is connected through a 2.7 kilo-ohm resistor R29 to the negative 15-volt source. Transistor Q10 forms the emitter stage EF4 of the receiver of FIG. 5. The emitter of transistor Q10 is connected to the source electrode of FET Q11. The drain electrode of the FET is connected to the base of an NPN transistor Q12 which forms the emitter follower stage EF5 of the receiver of FIG. 5. The transistor Q12 may be of the type designated 2N2984. Its base is connected to a 470 picofarad grounded capacitor C19, its collector is connected to the positive 15-volt source, and its emitter is connected through a 2.15 kilo-ohm resistor R27 and a 2.5 kilo-ohm resistor R26 to ground. The emitter of transistor Q12 is also connected through a 68 kilo-ohm resistor R25 to the positive 15-volt source.

The junction of resistors R26 and R27 is connected to one of the inputs of comparator 20, whereas the emitter of transistor Q21 in the emitter follower stage EF3 is connected to the other input of the comparator. The comparator may be of the type designated LM161P. The input terminals of the comparator are shunted by a pair of diodes CR15 and CR16.

The receiver of FIG. 10 operates in the same manner as the receiver of FIG. 5, as described above.

The receiver of the invention is advantageous in that automatic gain control maintains linear handling of the input signal with preservation of rise and fall times, pulse width. transition timing and signal-to-noise ratios. The fast automatic gain control loop component together with the switches S1 and S2 provide quick and accurate acquisition of the control voltage. The offset correction circuit causes all stages of the receiver to operate at low offset. The resulting maintenance of signal base line stability assures accurate threshold generation and comparison. The delayed signal voltage compared with the accurate fast threshold voltage allows each pulse comparison to occur at the correct decision level.

The invention provides, therefore, an improved receiver for the detection of unipolar Manchester optical signals, which receiver incorporates a fast, one-pulse automatic gain control system, adaptive threshold voltage generation which includes a segmented filter and delayed signal technique, and direct current base line offset correction combined with the automatic gain control.

It will be appreciated that although particular embodiments of the invention have been shown and described, modifications may be made. It is intended in the following claims to cover all such modifications which come within the true spirit and scope of the invention.

What is claimed is:

1. A receiver for use in a fiber optic data communication system for recovering multi-bit binary digital messages from unipolar trapezoidal Manchester optical signals transmitted in the system, said receiver including:

a photo-detector circuit for converting the received optical signals into a range of unipolar electrical signals;

an amplifier circuit direct-current coupled to the photo-detector circuit for amplifying the unipolar electric signals in said range;

a comparator coupled to the output of the amplifier for converting the amplified unipolar signals into bipolar signals; and a threshold circuit coupled to the output of the amplifier circuit and to the comparator for establishing a switching point for the comparator at the mid-amplitude level of the received optical signals, and in which said amplifier circuit includes a direct current coupled pre-amplifier and post-amplifier, said pre-amplifier performing wide-band conversion of the output currents within said range from the photo-detector circuit into input signal voltages within said range for the post-amplifier, and the post-amplifier amplifying the signal voltages within said range to the level required for comparison by said comparator, and which includes a bandpass filter interposed between the output of said post-amplifier and the input of the comparator for decreasing the root-mean-square noise voltage in the amplified signals, and which includes an offset correction circuit connected to the output of said filter circuit and to the input of said pre-amplifier for providing offset correction voltages to the base line of the signals translated by the amplifier circuit.

2. The receiver defined in claim 1, in which said offset correction circuit includes a capacitor for storing the offset voltage, and switching means for connecting the amplifier circuit in a unity gain, direct current coupled feedback amplifier configuration during the message-off condition of the input signal; and control means for opening the switching means at the beginning of each new message to enable the amplifier circuit to operate with negligible offset for the duration of the message, with the voltage across the capacitor acting as a compensating voltage for actual amplifier offsets.

3. A receiver for use in a fiber optic data communication system for recovering multi-bit binary digital messages from unipolar trapezoidal Manchester optical signals transmitted in the system, said receiver including:

a photo-detector circuit for converting the received optical signals into a range of unipolar electrical signals;

an amplifier circuit direct-current coupled to the photo-detector circuit for amplifying the unipolar electric signals in said range;

a comparator coupled to the output of the amplifier for converting the amplified unipolar signals into bipolar signals; and a threshold circuit coupled to the output of the amplifier circuit and to the comparator for establishing a switching point for the comparator at the mid-amplitude level of the received optical signals, and which includes an automatic gain control circuit coupled to the output of the amplifier circuit for controlling the gain thereof, and which includes a signal delay channel out amplifier interposed between said amplifier circuit and the comparator, and a feed-forward amplifier included in the automatic gain control circuit to provide automatic gain control acquisition during the signal delay period provided by said out amplifier.

4. A receiver for use in a fiber optic data communication system for recovering multi-bit binary digital messages from unipolar trapezoidal Manchester optical signals transmitted in the system, said receiver including:

a photo-detector circuit for converting the received optical signals into a range of unipolar electrical signals;

an amplifier circuit direct-current coupled to the photo-detector circuit for amplifying the unipolar electric signals in said range;

a comparator coupled to the output of the amplifier for converting the amplified unipolar signals into bipolar signals; and a threshold circuit coupled to the output of the amplifier circuit and to the comparator for establishing a switching point for the comparator at the mid-amplitude level of the received optical signals, and in which said amplifier circuit includes a direct current coupled pre-amplifier and post-amplifier, said pre-amplifier performing wide-band conversion of the output currents within said range from the photo-detector circuit into input signal voltages within said range for the post-amplifier, and the post-amplifier amplifying the signal voltages within said range to the level required for comparison by said comparator, and in which said pre-amplifier includes a field effect transistor differential amplifier for low direct current drift.

5. A receiver for use in a fiber optic data communication system for recovering multi-bit binary digital messages from unipolar trapezoidal Manchester optical signals transmitted in the system, said receiver including:

a photo-detector circuit for converting the received optical signals into a range of unipolar electrical signals;

an amplifier circuit direct-current coupled to the photo-detector circuit for amplifying the unipolar electric signals in said range;

a comparator coupled to the output of the amplifier for converting the amplified unipolar signals into bipolar signals;

a threshold circuit coupled to the output of the amplifier circuit and to the comparator for establishing a switching point for the comparator at the mid-amplitude level of the received optical signals, and in which said amplifier circuit includes a direct current coupled pre-amplifier and post-amplifier, said pre-amplifier performing wide-band conversion of the output currents within said range from the photo-detector circuit into input signal voltages within said range for the post-amplifier, and the post-amplifier amplifying the signal voltages within said range to the level required for comparison by said comparator, and which includes an automatic gain control circuit coupled to the output of the post-amplifier for controlling the gain of the post-amplifier, and in which said automatic gain control circuit includes a feed-forward amplifier, and a filter, switching means connected across the filter, and means for closing the switching means at the beginning of each message received by the receiver to speed up the automatic gain control acquisition by obviating the delay caused by the filter.

6. A receiver for use in a fiber optic data communication system for recovering multi-bit binary digital messages from unipolar trapezoidal Manchester optical signals transmitted in the system, said receiver including:

a photo-detector circuit for converting the received optical signals into a range of unipolar electrical signals;

an amplifier circuit direct-current coupled to the photo-detector circuit for amplifying the unipolar electric signals in said range;

a comparator coupled to the output of the amplifier for converting the amplified unipolar signals into bipolar signals;

a threshold circuit coupled to the output of the amplifier circuit and to the comparator for establishing a switching point for the comparator at the mid-amplitude level of the received optical signals, and in which said amplifier circuit includes a direct current coupled pre-amplifier and post-amplifier, said pre-amplifier performing wide-band conversion of the output currents within said range from the photo-detector circuit into input signal voltages within said range for the post-amplifier, and the post-amplifier amplifying the signal voltages within said range to the level required for comparison by said comparator, and which includes an automatic gain control circuit coupled to the output of the post-amplifier for controlling the gain of the post-amplifier, and in which said automatic gain control circuit includes a diode, switching means connected across said diode, and means for closing the switching means at the beginning of each message received by the receiver to allow bidirectional current flow in the automatic gain control circuit to speed up the automatic gain control acquisition at the beginning of each message.

7. A receiver for use in a fiber optic data communication system for recovering multi-bit binary digital messages from unipolar trapezoidal Manchester optical signals transmitted in the system, said receiver including:

a photo-detector circuit for converting the received optical signals into a range of unipolar electrical signals;

an amplifier circuit direct-current coupled to the photo-detector circuit for amplifying the unipolar electric signals in said range;

a comparator coupled to the output of the amplifier for converting the amplified unipolar signals into bipolar signals;

a threshold circuit coupled to the output of the amplifier circuit and to the comparator for establishing a switching point for the comparator at the mid-amplitude level of the received optical signals, and in which said amplifier circuit includes a direct current coupled pre-amplifier and post-amplifier, said pre-amplifier performing wide-band conversion of the output currents within said range from the photo-detector circuit into input signal voltages within said range for the post-amplifier, and the post-amplifier amplifying the signal voltages within said range to the level required for comparison by said comparator, and which includes an automatic gain control circuit coupled to the output of the post-amplifier for controlling the gain of the post-amplifier, and in which the automatic gain control circuit includes a feed-forward amplifier, a diode, a filter and a field effect transistor, the output of the amplifier being fed through the diode and through the filter to the gate of the field effect transistor; first and second switching means connected respectively across the filter and the diode; and means for closing the first and second switching means at the beginning of each message received by the receiver to speed up the automatic gain control acquisition, by allowing bidirectional current in the automatic gain control circuit and by obviating the delay caused by the filter.

8. The receiver defined in claim 7, in which said first and second switching means each includes a field effect transistor.

9. The receiver defined in claim 7, in which said first switching means includes a field effect transistor and said second switching means includes a pair of diodes connected back-to-back.

* * * * *